(12) United States Patent
Kim

(10) Patent No.: US 6,192,409 B1
(45) Date of Patent: Feb. 20, 2001

(54) X.25 NETWORK CONNECTION FOR X.25 PROTOCOL COMMUNICATION USED IN A FULL ELECTRONIC SWITCHING SYSTEM

(75) Inventor: Hyeon-Sik Kim, Kyongsangbuk-do (KR)

(73) Assignee: SamSung Electronics Co., Ltd., Suwon (KR)

( * ) Notice: Under 35 U.S.C. 154(b), the term of this patent shall be extended for 0 days.

(21) Appl. No.: 09/114,213

(22) Filed: Jul. 13, 1998

(30) Foreign Application Priority Data

Jul. 11, 1997 (KR) ................................... 97-32230

(51) Int. Cl.$^7$ ...................................... G06F 13/00
(52) U.S. Cl. .......................... 709/230; 709/238; 709/250; 370/352
(58) Field of Search ..................................... 709/230, 238, 709/245, 246, 249, 250; 370/352, 354, 355, 356

(56) References Cited

U.S. PATENT DOCUMENTS

| | | |
|---|---|---|
| 4,979,100 | * 12/1990 | Makris et al. ........................ 710/117 |
| 5,001,704 | 3/1991 | Narup et al. . |
| 5,218,602 | 6/1993 | Grant et al. . |
| 5,363,369 | 11/1994 | Hemmady et al. . |
| 5,490,252 | 2/1996 | Macera et al. . |
| 5,502,718 | 3/1996 | Lane et al. . |
| 5,533,017 | 7/1996 | Thor . |
| 5,568,471 | 10/1996 | Hershey et al. . |
| 5,592,622 | 1/1997 | Isfeld et al. . |
| 5,634,015 | 5/1997 | Chang et al. . |
| 5,659,684 | 8/1997 | Giovannoni et al. . |
| 5,691,985 | 11/1997 | Lorenz et al. . |
| 5,727,149 | 3/1998 | Hirata et al. . |
| 5,740,174 | 4/1998 | Somer . |
| 5,751,951 | 5/1998 | Osborne et al. . |
| 5,999,525 | * 12/1999 | Krishnaswamy et al. ........... 370/352 |

* cited by examiner

Primary Examiner—Viet D. Vu
(74) Attorney, Agent, or Firm—Robert E. Bushnell, Esq.

(57) ABSTRACT

An X.25 network connection for X.25 protocol communication used in a full electronic switching system comprises: a microprocessor; a switching system interface circuit provided with a controller serving as master or slave relative to a main bus to convert the X.25 packet data from the X.25 network into IPC format data which is transferred to the switching system; a plurality of X.25 network interface circuits, each provided with a controller serving as master or slave relative to the main bus to convert the IPC format data into the X.25 packet data transferred to the X.25 network; a packet memory for temporarily storing the IPC format data from the switching system interface circuit and the X.25 packet data from the X.25 network interface circuits under the control of the MPU and controllers; a system memory for storing the system control program and application programs thereof and the data from the packet memory, for the MPU to analyze the IPC format data and X.25 format packet data; and a bus control circuit for controlling the input/output direction of the data and addresses of the internal circuits while preventing the collision of the data and addresses through the main bus.

18 Claims, 1 Drawing Sheet

X.25 NETWORK CONNECTION FOR X.25 PROTOCOL COMMUNICATION USED IN A FULL ELECTRONIC SWITCHING SYSTEM

CLAIM OF PRIORITY

This application makes reference to, incorporates the same herein, and claims all benefits accruing under 35 U.S.C. §119 from an application for X.25 NETWORK CONNECTION FOR X.25 PROTOCOL COMMUNICATION USED IN A FULL ELECTRONIC SWITCHING SYSTEM earlier filed in the Korean Industrial Property Office on Jul. 11, 1997 and there duly assigned Serial No. 32230/1997.

BACKGROUND OF THE INVENTION

1. Technical Field

The present invention concerns a fill electronic switching system, and more particularly an X.25 network connection for enabling X.25 protocol communication for a fill electronic switching system.

2. Related Art

A full electronic switching system is connected with an external X.25 protocol conversion unit by means of an IPC (Inter Process Communication) or LAN (Local Area Network) in order to communicate with an X.25 network through a single connection port. The IPC or LAN format of the data from the switching system is converted into the X.25 protocol format by the X.25 conversion unit so as to be transferred to the external X.25 network. Conversely, the X.25 protocol format from the external X.25 network is converted into the IPC or LAN format so as to be transferred to the switching system.

However, such external X.25 protocol conversion unit complicates the full electronic switching system because of additional connections cables and devices, thus increasing the cost. Moreover, since the data format conversion is made outside the switching system, any error occurring in the operation of the X.25 protocol conversion unit may risk loss of the transferred data or link breakage. The single connection port for communicating with the X.25 network requires that the switching system be further provided with a plurality of additional X.25 protocol conversion units in order to provide multiple connections with the X.25 network.

The following patents are considered to be representative of the prior art, and are burdened by the disadvantages set forth herein: U.S. Pat. No. 5,001,704 to Narup et al., entitled Multipurpose Bus Interface, U.S. Pat. No. 5,218,602 to Grant et al., entitled Interprocessor Switching Network, U.S. Pat. No. 5,490,252 to Macera et al., entitled System Having Central Processor For Transmitting Generic Packets To Another Processor To Be Altered And Transmitting Altered Packets Back To Central Processor For Routing, U.S. Pat. No. 5,363,369 to Hemmady et al., entitled System For Inter Packet Community Communication, U.S. Pat. No. 5,502,718 to Lane et al., entitled Device For Switching High Speed Protocol Units, And Corresponding Switching Procedure, U.S. Pat. No. 5,533,017 to Thor, entitled Line Interface Device For Fast-Packet Switching Network, U.S. Pat. No. 5,568,471 to Hershey et al., entitled System And Method For A Workstation Monitoring And Control Of Multiple Networks Having Different Protocols, U.S. Pat. No. 5,592,622 to Isfeld et al., entitled Network Intermediate System With Message Passing Architecture, U.S. Pat. No. 5,634,015 to Chang et al., entitled Generic High Bandwidth Adapter Providing Data Communications Between Diverse Communication Networks And Computer system, U.S. Pat. No. 5,659,684 to Giovannoni et al., entitled Methods And Apparatus for Interconnecting Personal Computers (PCA) And Local Area Networks (LANS) Using Packet Protocols Transmitted Over A Digital Data Service (DDS), U.S. Pat. No. 5,691,985 to Lorenz et al., entitled System And Method For Increasing Throughput Of Inter-Network Gateways Using A Hardware Assist Engine, U.S. Pat. No. 5,727,149 to Hirata et al., entitled Network Interface Apparatus And Data Transmission Control Method Thereof, U.S. Pat. No. 5,740,174 to Somer, entitled Method And apparatus For Performing Collision Detection And Arbitration Within An Expansion Bus Having Multiple Transmission Repeater Units, and U.S. Pat. No. 5,751,951 to Osborne et al., entitled Network Interface.

SUMMARY OF THE INVENTION

It is an object of the present invention to provide a full electronic switching system with an internal X.25 network connection for enabling X.25 protocol communication with the X.25 network.

It is another object of the present invention to provide a full electronic switching system with the capability of establishing multiple connections with the X.25 network.

According to the present invention, an X.25 network connection for X.25 protocol communication used in a full electronic switching system comprises: a microprocessor unit (MPU) for controlling all the internal circuits of the X.25 network connection while serving as master or slave to a main bus for interconnecting all of the internal circuits; a switching system interface circuit mounted with a controller serving as master or slave to the main bus to convert the X.25 packet data from the X.25 network into IPC format data transferred to the switching system; a plurality of X.25 network interface circuits, each mounted with a controller serving as master or slave to the main bus, for converting the IPC format data into the X.25 packet data transferred to the X.25 network; a packet memory for temporarily storing the IPC format data from the switching system interface circuit and the X.25 packet data from the X.25 packet data from the X.25 network interface circuits under the control of the MPU and controllers; a system memory for storing the system control program and application programs thereof, and the data from the packet memory, for the MPU to analyze the IPC format data and X.25 format packet data; and a bus control circuit for controlling the input/output direction of the data and addresses of the internal circuits while preventing the collision of the data and addresses through the main bus.

The present invention will now be described more specifically with reference to the drawings attached only by way of example.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
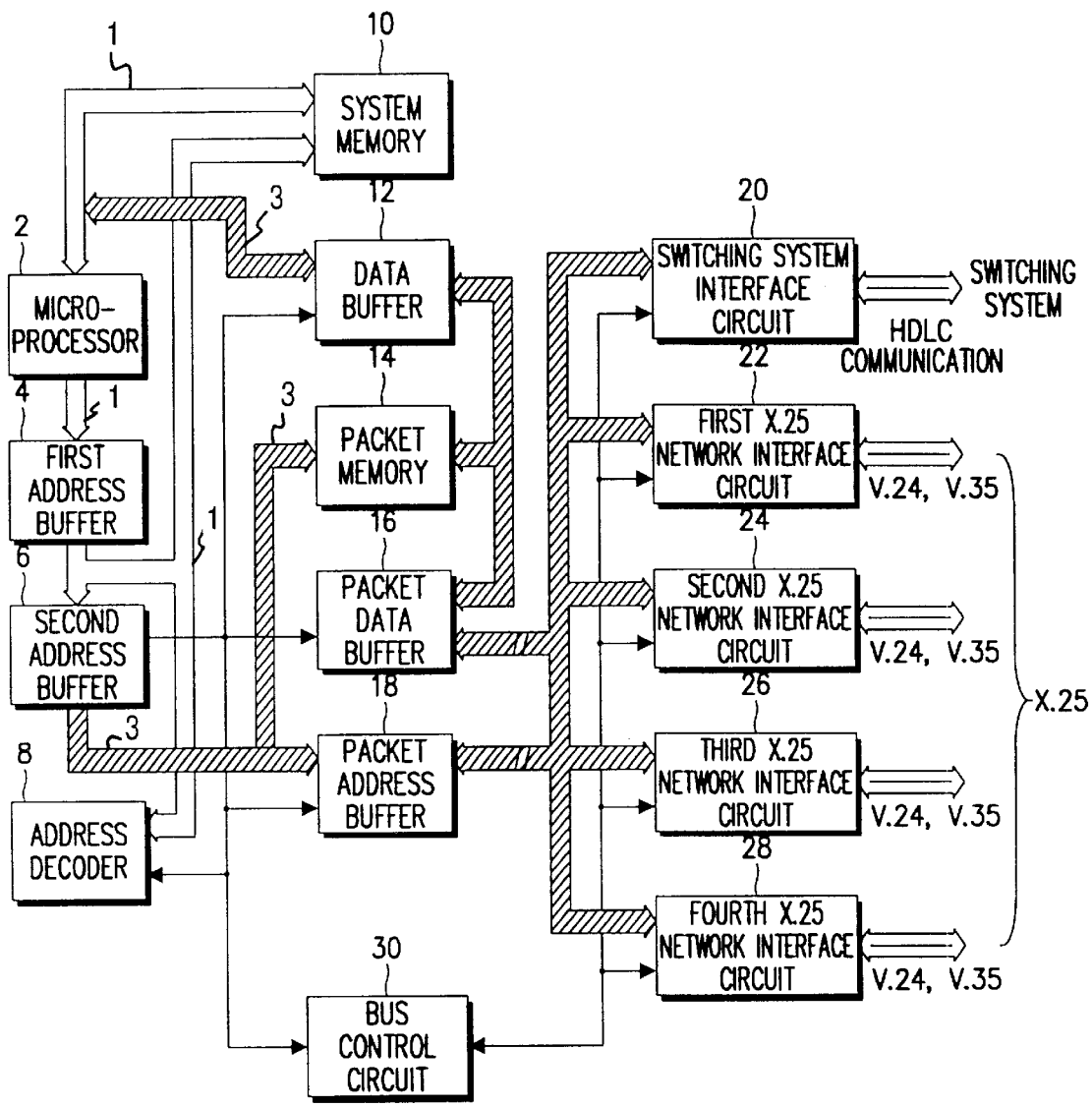
FIG. 1 is a block diagram illustrating the inventive X.25 network connection for enabling X.25 protocol communication for a full electronic switching system.

Referring to FIG. 1, an MPU 2 controls an X.25 network connection according to a control program and application programs thereof stored in a system memory 10, which also stores the HDLC format IPC data received from, or transferred to, the switching system and the X.25 format data received from, or transferred to, the X.25 network. First to fourth X.25 network interface circuits 22, 24, 26, 28 are respectively mounted with X.25 link level controller chips serving as master or slave in order to interface the X.25 network connection with an external X.25 network under the control of the MPU and a bus control circuit 30. Also provided is a switching system interface circuit 20, which is mounted with a controller chip serving as master or slave in order to interface the X.25 network connection with the switching system by receiving or transferring the HDLC format IPC data from or to the switching system under the control of the MPU 2 and the bus control circuit 30.

The IPC format data from the switching system and the X.25 protocol format packet data from the X.25 network are stored in a packet memory 14, which is controlled by the MPU 2 and the controllers of the first to fourth X.25 network interface circuits 22, 24, 26, 28 to transfer the stored data to its destination. A packet data buffer 16 and packet address buffer 18 are controlled through the main bus to properly direct the data and address while preventing the collision of the data and addresses between various devices.

A first address buffer 4 bypasses the address received from the MPU 2 to a second address buffer 6, the system memory 10 and an address decoder 8. Additionally provided is an auxiliary bus 1 with respect to which the MPU 2 always serves as master, and MPU 2 accesses the system memory 10 through it. When the MPU 2 serves as master to the main bus 3, it causes the address to be transferred through the auxiliary bus 1 to the second address buffer 6, which also transfers the address delivered by the first address buffer 4 to the packet address buffer 18 under the control of the bus control circuit 30 so as to access the packet memory 14 and to read/write from/to the controllers of the first to fourth X.25 network interface circuits 22, 24, 26, 28. The bus control circuit 30 controls the input/output directions of the data and addresses of the internal buffers to prevent the collision of the data and addresses through the main bus 3. The address decoder 8 decodes the addresses to enable the buffers and devices accessed by the MPU 2 and the controllers of the interface circuits 22, 24, 26, 28.

The operation of the X.25 network connection may be described in the following three ways:

Firstly, the MPU 2 accesses the controllers of the first to fourth X.25 network interface circuits 22, 24, 26, 28 to control them.

In the first step, the MPU 2 delivers the address of the interface circuit 22, 24, 26 or 28 for the read/write operation, through the first address buffer 4 to the second address buffer 6 and the address decoder 8, which generates the interface selection signal SEL0–SEL4 delivered to the bus control circuit 30.

In the second step, the bus control circuit 30 detects whether the main bus 3 is busy. If the main bus 3 is not busy, the bus control circuit 30 generates a buffer control signal to enable the second address buffer 6 and packet address buffer 18 so as to transfer the address stored in the second address buffer 6 through the main bus 3 to the packet address buffer 18 and to the corresponding interface circuit. However, if the main bus 3 is occupied by another circuit, the second address buffer 6 and packet address buffer 18 are not enabled, and the MPU 2 stands by in the first step until allowed to use the main bus 3.

In the third step, if the main bus 3 is allowed to be used, the interface enabling signal XSEL0–XSEL4 is transferred to the selected one of the first to fourth X.25 network interface circuits 22, 24, 26, 28 according to the interface selection signal SEL0–SEL4 from the address decoder 8. Then, the bus control circuit 30 generates a control signal to transfer the data ZD0–ZD31 through the data buffer 12 to the packet data buffer 16, through which is read/written the selected interface circuit 22, 24, 26, or 28 is read from or written to. That is, the MPU 2 writes the data into the controller of the selected interface circuit 22, 24, 26 or 28 through the data buffer 12 and the packet data buffer 16, and reads the data from the controller through the packet data buffer 16 and the data buffer 12. Of course, the input/output direction of the address corresponds with that of the data.

Secondly, the MPU 2 accesses the packet memory 14. In the first step, the MPU 2 delivers the address through the first address buffer 4 to the second address buffer 6 and the address decoder 8.

In the second step, the bus control circuit 30 detects whether the main bus 3 is busy. If the main bus 3 is not busy, the bus control circuit 30 enables the second address buffer 6 to transfer the address to the packet memory 14 and allows use or the main bus 3. However, if the main bus 3 is occupied by another circuit, the bus control circuit 30 does not provide an enabling signal to the address decoder 8, and the MPU 2 stands by in the first step until allowed to use the main bus 3.

In the third step, the address decoder 8 generates the packet memory selection signal PRCS0–PRCS3 to enable the packet memory 14. The data buffer 12 and the address buffer 6 were enabled in the first and second steps and, therefore, the address and data loaded in the auxiliary bus 1 are transferred through the main bus 3 to the packet memory 14 to read/write. In this case, the MPU 2 writes the data output CD0–CD31 into the packet memory 14 through the output ZD0–ZD31 of the data buffer 12, and the output address IA0–IA23 os provided to the packet memory 14 through the output AA0–AA23 of the second address buffer 6. Conversely, when the MPU 2 reads data, the direction of the output address IA0–IA23 is the same as for writing, and the output direction of the stored data corresponding to the address is reversed relative to the direction for writing.

Thirdly, the controller of the interface circuit 20, 22, 24, 26, or 28 access the packet memory 14. In the first step, the interface circuit 20, 22, 24, 26 or 28 provides a bus request signal XH0–XH4 for occupying the main bus 3 to the bus control circuit 30 when data to be transferred or received in the switching system or in the external X.25 network exists. The packet memory 14 is read from or written to according to whether data is transmitted or received.

In the second step, the bus control circuit 30 detects whether the main bus 3 is busy. If the main bus 3 is not busy, the bus control circuit 30 generates the bus allowance signal XHA0–XHA4 to allow the interface circuit 20, 22, 24, 26 or 28 to use the main bus 3. In this case, the controller of the interface circuit 20, 22, 24, 26 or 28 serves as master to the main bus 3, generating multiplexed data XAD0–XAD15 relating to the address and data. However, if the main bus 3 is occupied by another circuit, the bus control circuit 30 does not allow the interface circuit 20, 22, 24, 26 or 28 to use the main bus 3, and the interface circuit keeps on generating the bus allowance signal XH0–XH4 in the first step until use or the main bus 3 is allowed.

In the third step, if use of the main bus 3 is allowed, the controller of the allowed interface circuit 20, 22, 24, 26 or 28 serves as master to the main bus 3, and the controllers of the other interface circuits are set as slaves. Then, the master controller provides the mixed data XAD0–XAD15 relating to the address and data to the packet data buffer 16 and packet address buffer 18, while the bus control circuit 30 provides a buffer control signal to the packet data buffer 16 and packet address buffer 18.

In the fourth step, receiving the buffer control signal, the packet data buffer 16 and packet address buffer 18 separate the address and the data, so that the address from the packet address buffer 18 is put into the packet memory 14, and the data from the packet data buffer 16 is connected with the data line of the packet memory 14, and written into or read from it. Completing the read/write cycle, the controllers of the interface circuits 20, 22, 24, 26, 28 are set as slaves.

When writing data, the multiplexed address/data output XAD0–XAD15 of the interface circuit 20, 22, 24, 26, 28 is delivered to the packet data buffer 16 and the packet address buffer 18. Then, the packet data buffer 16 extracts the data ZD0–ZD31, and the packet address buffer 18 is extracts the address AA0–AA23, so as to write to the packet memory 14. Conversely, when reading data, the multiplexed address/data output XAD0–XAD15 is delivered to the packet address buffer 18 so as to extract the address AA0–AA23 written into the packet memory 14. Then, the data stored in the packet memory 14 and corresponding to the inputted address AA0–AA23 is transferred to the packet data buffer 16, which generates the output XAD0–XAD31 and the latter outputs is read by the controller of the interface circuit 20, 22, 24, 26 or 28 through the main bus 3.

In conclusion, when transmitting a packet data to the X.25 network by using the inventive X.25 network connection, the controller of the system interface circuit 20 first receives the IPC data from the switching system through the HDLC transmission line. Then, the controller serves as master to the main bus 3 to transfer the IPC data through the packet data buffer 16 to the packet memory 14. Thereafter, the controller provides an interrupt signal to the MPU 2, and finally it is set as a slave.

Receiving the interrupt signal, the MPU 2 detects the IPC data stored in the packet memory 14, serves as master to the main bus 3 to read the IPC data from the packet memory 14, and finishes use of the main bus 3 after storing the IPC data into the system memory 10. Then, the MPU 2 analyzes and formats the IPC data into the X.25 protocol format data stored in the packet memory 14. Thereafter, the MPU 2 occupies the main bus 3 to control the controller of the designated X.25 network interface circuit 22, 24, 26 or 28 to extract the formatted data from the packet memory 14 and to transmit it to the external X.25 network. Consequently, the controller of the designated X.25 network interface circuit 22, 24, 26 or 28 serves as master to the main bus 3 so as to extract the formatted data from the packet memory 14, and to transmit it as packet data to the X.25 network.

The process of receiving the packet data from the X.25 network is the reverse of the process of transmitting packet data to the X.25 network, and that will be readily understood without further description.

As stated above, the present invention provides a full electronic switching system with an X.25 network connection for X.25 protocol communication, and employs a single printed circuit board on which an MPU 2 and a plurality of X.25 link level controller chips corresponding to interface circuit 20, 22, 24, 26 or 28 are mounted. Each controller serves as master or slave under the control of the MPU 2 to directly connect the switching system with the X.25 network without using any external X.25 network connection. This considerably reduces the errors which may occur in receiving and transmitting the packet data. In addition, the number of ports for connecting to the X.25 network may be increased according to the capacity of the MPU 2, thereby reducing cost.

It should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. An X.25 network connection for X.25 protocol communications used in a full electronic switching system, comprising:, microprocessor (MPU) means for controlling internal circuits of said X.25 network connection in accordance with serving as one of a master and a slave relative to a main bus for interconnecting said internal circuits;

switching system interface circuit means provided with a controller for serving as one of a master and a slave relative to said main bus so as to convert X.25 packet data from an X.25 network into IPC (Inter Process Communication) format data for transfer to said switching system;

a plurality of X.25 network interface circuits, each provided with a controller serving as one of a master and a slave relative to said main bus so as to convert the IPC format data into the X.25 packet data for transfer to said X.25 network;

packet memory means for temporarily storing the IPC format data from said switching system interface circuit means and said X.25 packet data from said X.25 network interface circuits under the control of said MPU means and said controllers of said X.25 network interface circuits;

system memory means for storing a system control program and application programs thereof, and for storing data from said packet memory means for said MPU means to analyze said IPC format data and said X.25 format packet data; and bus control circuit means for controlling input and output directions of data and addresses of said internal circuits while preventing collision of the data and addresses through said main bus;

wherein said packet memory means comprises:

a packet memory for temporarily storing the IPC format data from said switching system interface circuit means and the X.25 format packet data from said X.25 network interface circuits;

a packet address buffer for buffering addresses generated by said MPU means and said controllers of the X.25 network interface circuits to access said packet memory and to control said X.25 network interface circuits;

a packet data buffer for buffering data transferred from said controllers of the X.25 network interface circuits to said packet memory; and a data buffer for buffering data generated by said MPU means so as to access said packet memory.

2. An X.25 network connection as defined in claim 1, further comprising an auxiliary bus for connecting said MPU means with said system memory means when said MPU means serves as said slave relative to said main bus.

3. An X.25 network connection for X.25 protocol communication used in a full electronic switching system, comprising:

microprocessor unit MPU means for controlling internal circuits of said X.25 network connection in accordance with serving as one of a master and a slave relative to a main bus and for interconnecting said internal circuits;

switching system interface circuit means provided with a controller serving as one of a master and a slave relative to said main bus for converting X.25 packet data from an X.25 network into IPC format data for transfer to said switching system;

a plurality of X.25 network interface circuits, each provided with a controller serving as one of a master and a slave relative to said main bus so as to convert the IPC format data into the X.25 packet data for transfer to said X.25 network;

packet memory means for temporarily storing the IPC format data from said switching system interface circuit means and the X.25 format packet data from said X.25 network interface circuits;

packet address buffer means for buffering addresses generated by said MPU means and said controllers of the X.25 network interface circuits so as to access said packet memory means and to control said X.25 network interface circuits;

packet data buffer means for buffering data transferred from said controllers of the X.25 network interface circuits to said packet memory means;

data buffer means for buffering data generated by said MPU means so as to access said packet memory means;

system memory means for storing a system control program and application programs thereof, and for storing data from said packet memory means, for said MPU means to analyze said IPC format data and said X.25 packet data;

bus control circuit means for controlling an input/output direction of data and addresses of said internal circuits while preventing collision of the data and addresses through said main bus; and address decoder means for providing said packet address buffer means, said packet data buffer means, and said data buffer means with an enabling signal under the control of said bus control circuit means.

4. A network connection for communication using an X.25 protocol in a switching system, comprising:

microprocessor (MPU) means for controlling internal circuits of said network connection in accordance with serving as one of a master and a slave relative to a main bus for interconnecting said internal circuits;

switching system interface circuit means for serving as one of a master and slave relative to said main bus so as to convert packet data from an X.25 network into predetermined format data for transfer to said switching system;

a plurality of network interface circuits, each serving as one of a master and a slave relative to said main bus so as to convert the predetermined format data into the packet data for transfer to said X.25 network;

packet memory means for temporarily storing the predetermined format data from said switching system interface circuit means and said packet data from said network interface circuits under the control of said MPU means and said network interface circuits; and bus control circuit means for controlling input and output directions of data and addresses of said internal circuits while preventing collision of the data and addresses through said main bus;

wherein said packet memory means comprises a data buffer for buffering data generated by said MPU means.

5. The network connection of claim 4, further comprising system memory means for storing a system control program, and for storing data from said packet memory means for said MPU means to analyze said predetermined format data and said packet data.

6. The network connection of claim 4, wherein said packet memory means further comprises a packet memory for temporarily storing the predetermined format data from said switching system interface circuit means and the packet data from said network interface circuits.

7. The network connection of claim 6, wherein said packet memory means further comprises a packet address buffer for buffering addresses generated by said MPU means and said network interface circuits to access said packet memory and to control said network interface circuits.

8. The network connection of claim 7, wherein said packet memory means further comprises a packet data buffer for buffering data transferred from said network interface circuits to said packet memory.

9. The network connection of claim 6, wherein said packet memory means further comprises a packet data buffer for buffering data transferred from said network interface circuits to said packet memory.

10. The network connection of claim 4, further comprising:

system memory means for storing a system control program; and auxiliary bus means for connecting said MPU means and said system memory means when said MPU means serves as said slave relative to said main bus.

11. The network connection of claim 4, wherein said packet memory means comprises a packet address buffer and a packet data buffer, said network connection further comprising address decoder means for providing said packet address buffer, said packet data buffer, and said data buffer with an enabling signal.

12. A network connection for communication in a switching system using an X.25 protocol, comprising:

microprocessor (MPU) means for controlling internal circuits of said network connection in accordance with serving as one of a master and a slave relative to a main bus for interconnecting said internal circuits;

switching system interface circuit means for serving as one of a master and a slave relative to said main bus so as to convert packet data from an X.25 network into predetermined format data for transfer to said switching system;

a plurality of network interface circuits, each serving as one of a master and slave relative to said main bus so as to convert the predetermined format data into the packet data for transfer to said X.25 network;

packet memory means for temporarily storing the predetermined format data from said switching system interface circuit means and the packet data from said network interface circuits; and data buffer means for buffering data generated by said MPU means so as to access said packet memory means.

13. The network connection of claim 12, further comprising packet data buffer means for buffering data transferred from said network interface circuits to said packet memory means.

14. The network connection of claim 12, further comprising system memory means for storing a system control program and data from said packet memory means for said MPU means to analyze said predetermined format data and said packet data.

15. The network connection of claim 12, further comprising bus control circuit means for controlling an input/output direction of data and addresses of said internal circuits while preventing collision of the data and addresses through said main bus.

16. The network connection of claim 12, further comprising a packet address buffer, a packet data buffer, and address decoder means for providing said packet address buffer, said packet data buffer, and said data buffer means with an enabling signal.

17. The network connection of claim 16, further comprising bus control circuit means for controlling an input/output direction of data and addresses of said internal circuits, and wherein said address decoder means provides said enabling signal.

18. The network connection of claim 12, further comprising packet address buffer means for buffering addresses generated by said MPU means and said network interface circuits so as to access said packet memory means and to control said network interface circuits.

* * * * *